(12) United States Patent
Zhang et al.

(10) Patent No.: US 12,092,787 B2
(45) Date of Patent: Sep. 17, 2024

(54) APPARATUS AND METHOD FOR OBTAINING REAL-TIME TRUE FORMATION POROSITY USING PULSED NEUTRON WELL LOGGING TOOL HAVING DUAL-FUNCTION DETECTORS

(71) Applicant: CHINA PETROLEUM & CHEMICAL CORPORATION, Beijing (CN)

(72) Inventors: Jeremy Zhang, Houston, TX (US); Sheng Zhan, Houston, TX (US)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 0 days.

(21) Appl. No.: 17/653,561

(22) Filed: Mar. 4, 2022

(65) Prior Publication Data
US 2022/0308253 A1 Sep. 29, 2022

Related U.S. Application Data

(63) Continuation-in-part of application No. 17/333,834, filed on May 28, 2021.
(Continued)

(51) Int. Cl.
*G01V 5/10* (2006.01)
*E21B 49/00* (2006.01)

(52) U.S. Cl.
CPC .............. *G01V 5/105* (2013.01); *E21B 49/00* (2013.01)

(58) Field of Classification Search
CPC .......... G01V 5/105; G01V 5/10; E21B 49/00; E21B 2200/20
See application file for complete search history.

(56) References Cited

U.S. PATENT DOCUMENTS 3,521,065 A * 7/1970 Locke ..................... G01V 5/145
250/266
4,122,339 A * 10/1978 Smith, Jr. .............. G01V 5/105
250/269.2
(Continued)

FOREIGN PATENT DOCUMENTS

CN 101501531 A 8/2009
CN 103890615 A 6/2014
(Continued)

*Primary Examiner* — David P Porta
*Assistant Examiner* — Gisselle M Gutierrez
(74) *Attorney, Agent, or Firm* — NKL Law; Allen Xue

(57) ABSTRACT

A method for measuring subterranean formation porosity includes the steps of: deploying a nuclear logging tool having one or more neutron sources and two or more dual-function detectors disposed in into a subterranean formation; causing the one or more neutron sources to emit neutrons in a plurality of neutron pulses into the subterranean formation and generating neutrons and gamma rays in the subterranean formation; obtaining one or more neutron count rates for each of the two or more detectors; determining a formation type of the subterranean formation based on gamma rays received at the one or more detectors; calculating one or more neutron count rate ratios between the neutron count rates of two detectors selected from the two or more detectors; and obtaining one or more formation porosities based on the formation type and the one or more neutron count rate ratios.

11 Claims, 15 Drawing Sheets

Related U.S. Application Data

(60) Provisional application No. 63/148,571, filed on Feb. 11, 2021, provisional application No. 63/148,573, filed on Feb. 11, 2021.

(56) References Cited

U.S. PATENT DOCUMENTS

| | | | |
|---|---|---|---|
| 5,327,773 A | 7/1994 | Nishimura et al. | |
| 5,349,184 A | 9/1994 | Wraight | |
| 5,377,105 A * | 12/1994 | Smith | G01V 5/107 73/152.59 |
| 5,521,378 A * | 5/1996 | Roscoe | G01V 5/101 250/269.6 |
| 5,699,246 A * | 12/1997 | Plasek | G01V 11/00 175/50 |
| 7,633,058 B2 | 12/2009 | Stoller et al. | |
| 8,050,866 B2 * | 11/2011 | Jacobson | G01V 5/101 702/8 |
| 8,598,510 B2 * | 12/2013 | Zhang | G01V 5/101 250/261 |
| 8,637,807 B2 | 1/2014 | Evans et al. | |
| 8,849,573 B2 * | 9/2014 | Zhang | G01V 5/04 250/269.4 |
| 10,061,056 B2 * | 8/2018 | Moake | E21B 47/00 |
| 11,078,771 B2 * | 8/2021 | Han | E21B 43/267 |
| 2006/0192096 A1 | 8/2006 | Radtke et al. | |
| 2008/0308720 A1 * | 12/2008 | Ferguson | G01V 5/101 250/269.6 |
| 2009/0045329 A1 | 2/2009 | Stoller | |
| 2010/0262371 A1 * | 10/2010 | Oraby | G01V 5/104 702/8 |
| 2011/0112810 A1 | 5/2011 | Scoullar et al. | |
| 2011/0204217 A1 * | 8/2011 | Oraby | G01V 5/104 250/269.6 |
| 2011/0224906 A1 | 9/2011 | Zhang et al. | |
| 2012/0016588 A1 * | 1/2012 | Evans | G01V 5/104 702/8 |
| 2012/0126106 A1 * | 5/2012 | Zhou | G01V 5/104 250/269.6 |
| 2012/0197529 A1 * | 8/2012 | Stephenson | G01V 5/101 250/269.6 |
| 2012/0326048 A1 | 12/2012 | Nikitin et al. | |
| 2013/0206972 A1 | 8/2013 | Zhou et al. | |
| 2013/0264486 A1 | 10/2013 | Bingham et al. | |
| 2014/0001350 A1 * | 1/2014 | Beekman | G01V 5/102 250/269.6 |
| 2014/0339410 A1 | 11/2014 | Zhou et al. | |
| 2014/0343856 A1 | 11/2014 | Zhou et al. | |
| 2015/0234084 A1 * | 8/2015 | Thornton | G01V 5/107 250/262 |
| 2016/0024909 A1 * | 1/2016 | Han | E21B 47/11 166/250.1 |
| 2016/0154141 A1 | 6/2016 | Moake | |
| 2016/0349399 A1 | 12/2016 | Zhou | |
| 2017/0045639 A1 * | 2/2017 | Zhou | G01V 5/101 |
| 2017/0176635 A1 | 6/2017 | Kramer | |
| 2017/0211382 A1 | 7/2017 | Jacobson et al. | |
| 2017/0315260 A1 | 11/2017 | Stoller | |
| 2017/0362931 A1 | 12/2017 | Homan et al. | |
| 2018/0164469 A1 | 6/2018 | Kuespert | |
| 2018/0172876 A1 | 6/2018 | Inanc et al. | |
| 2018/0231683 A1 | 8/2018 | Teague et al. | |
| 2019/0025454 A1 * | 1/2019 | Galford | G01V 5/107 |
| 2019/0094410 A1 | 3/2019 | Mendez et al. | |
| 2022/0252755 A1 * | 8/2022 | Zhan | G01V 5/102 |
| 2022/0413180 A1 * | 12/2022 | Zhan | G01V 5/104 |
| 2023/0123713 A1 * | 4/2023 | Zhan | G01V 5/045 250/269.6 |
| 2023/0204813 A1 * | 6/2023 | Zhan | E21B 49/00 250/269.2 |

FOREIGN PATENT DOCUMENTS

| | | | | |
|---|---|---|---|---|
| CN | 108643890 A | * | 10/2018 | E21B 47/11 |
| CN | 110454147 A | | 11/2019 | |
| CN | 110612463 A1 | | 12/2019 | |
| WO | WO-2012064797 A2 | * | 5/2012 | G01V 5/104 |
| WO | 2013148998 A1 | | 10/2013 | |
| WO | 2019060320 A2 | | 3/2019 | |
| WO | 2020219148 A1 | | 10/2020 | |

* cited by examiner

APPARATUS AND METHOD FOR OBTAINING REAL-TIME TRUE FORMATION POROSITY USING PULSED NEUTRON WELL LOGGING TOOL HAVING DUAL-FUNCTION DETECTORS

RELATED APPLICATIONS

This application is a continuation-in-part application of U.S. application Ser. No. 17/333,834, titled "Nuclear Logging Tools and Applications Thereof," filed May 28, 2021, which claims the benefit of priority under 35 U.S.C. § 119 to U.S. Provisional Application No. 63/148,571, filed on Feb. 11, 2021, and U.S. Provisional Application No. 63/148,573, filed on Feb. 11, 2021, the entire contents of which are incorporated herein by reference.

BACKGROUND

1. Field of Technology

This disclosure provides methods and systems for nuclear well logging and formation evaluation, particularly methods and systems to obtain real-time true formation porosity using pulsed neutron logging tool having multiple dual-function detectors.

2. Description of Related Art

In oil and gas exploration, porosity, mineralogy, density, and gas/oil saturation are important formation parameters for evaluating the total oil/gas reserves in a field. Various wireline and LWD (Logging-While-Drilling) logging tools have been developed for the measurement of downhole formation parameters.

Neutron porosity logging tools investigate the formation porosity by measuring the ratio of neutron count rates from a near detector to that of a far detector after fast neutrons from an isotope neutron source (e.g., an Am—Be source) have been slowed down by tool surroundings (e.g., wellbore fluid and formation) and scattered back to the detectors. The ratio is then translated to porosity according to the specific formation mineralogy (e.g., sandstone, limestone, or dolomite). Using the ratio of count rates from two detectors reduces the effect of variations in the near-wellbore environment (wellbore fluid, borehole size, etc.) on the porosity measurement.

To accurately estimate porosity, one would need to know formation type or mineralogy (e.g., limestone, sandstone, or dolomite) so that one may use a ratio-to-porosity transform specific to the relevant formation type. FIG. 1 is an exemplary chart showing the transform between the near-to-far ratio of neutron count rates and porosity for three types of formation types. Currently, two different logging tools—a compensated neutron porosity tool and a pulsed neuron mineralogy tool—are utilized to obtain formation porosity and mineralogy separately. Otherwise, formation porosity estimation using the standard ratio-to-porosity transform for limestone may either overestimate or underestimate formation porosity. For example, for the 25 p.u. sandstone, if the standard limestone ratio-to-porosity transform is used, the apparent porosity is about 20 p.u.; for the 17 p.u. dolomite, if the standard limestone ratio-to-porosity transform is used, the apparent porosity is about 20 p.u. The deviations are illustrated in FIG. 2.

Since the precise mineralogy of the formation cannot be obtained simultaneously with the neutron counts using a neutron logging tool, current neutron porosity measurements usually provide three sets of porosity values based on three different formation types—limestone, sandstone, or dolomite mineralogy. Accordingly, there is a need to measure formation mineralogy and neutron count rates simultaneously to accurately estimate the local porosity of the formation while drilling. The present disclosure provides new logging tools combining neutron sources and dual-function detectors as well as methods for estimating local formation porosity real time by determining formation type and neutron count rates simultaneously.

SUMMARY

This summary is provided to introduce a selection of concepts in a simplified form that are further described below in the detailed description. It is not intended to identify key features or essential features of the claimed subject matter, nor is it intended to be used as an aid in determining the scope of the claimed subject matter.

According to one of the embodiments in the current disclosure, a method for measuring subterranean formation porosity includes the steps of: deploying a nuclear logging tool into a subterranean formation, wherein the nuclear logging tool comprises one or more neutron sources and two or more detectors disposed in a housing, each of the one or more neutron sources being configured to generate neutrons in pulses and each of the two or more detectors operable to detect neutrons and gamma rays; causing the one or more neutron sources to emit neutrons in a plurality of neutron pulses into the subterranean formation and generating neutrons and gamma rays in the subterranean formation; obtaining one or more neutron count rates for each of the two or more detectors; determining a formation type of the subterranean formation based on gamma rays received at the one or more detectors; calculating one or more neutron count rate ratios between the neutron count rates of two detectors selected from the two or more detectors; and obtaining one or more formation porosities based on the formation type and the one or more neutron count rate ratios.

According to some embodiments, the step of determining the formation type of subterranean formation includes the steps of: obtaining a first gamma ray energy spectrum from fast neutron inelastic scattering; stripping the first gamma ray energy spectrum to identify a first plurality of elements in the subterranean formation; and determining the formation type based on a plurality of identified elements.

According to other embodiments, the step of determining the formation type of subterranean formation also includes the steps of obtaining a second gamma ray energy spectrum from thermal neutron capture reactions; and stripping the second gamma ray energy spectrum to identify a second plurality of elements in the subterranean formation.

In some embodiments, the plurality of identified elements include the first plurality of elements and the second plurality of elements.

According to further embodiments, the method further includes calculating concentrations of the plurality of identified elements, and correlating the calculated concentrations to determine the formation type of the subterranean formation.

According to still other embodiments, one or more neutron count rates are selected from a total neutron count rate for total neutrons, a fast neutron count rate for fast neutrons, an epithermal neutron count rate for epithermal neutrons, and a thermal neutron count rate for thermal neutrons.

According to still further embodiments, the method also includes separating signals from neutrons from signals from gamma rays for each of the two or more detectors using a pulse shape discrimination technique.

In some further embodiments, the formation porosity is obtained by correlating one of the one or more neutron count rate ratio with a ratio-to-porosity transform of the identified formation type.

In other additional embodiments, the nuclear logging tool comprises three or more detectors so that the method includes calculating three or more neutron count rate ratios based on neutron count rates received at the three or more detectors.

In one of the further embodiments, the three of more count ratios obtained from three or more detectors are used to obtain one adjusted neutron count ratio, and the formation porosity is obtained by correlating the adjusted neutron count ratio with a ratio-to-porosity transform of the identified formation type.

In another further embodiments, three or more values of the formation porosity are obtained by correlating the three or more neutron count rate ratios with a ratio-to-porosity transform of the identified formation type.

The disclosure also provides a wireline logging tool, which contains a nuclear logging tool of the current disclosure and an electric cable connect to a piece of equipment on the surface, e.g., a wireline truck.

BRIEF DESCRIPTION OF THE DRAWINGS

The teachings of the present invention can be readily understood by considering the following detailed description in conjunction with the accompanying drawings.

Figure 1:
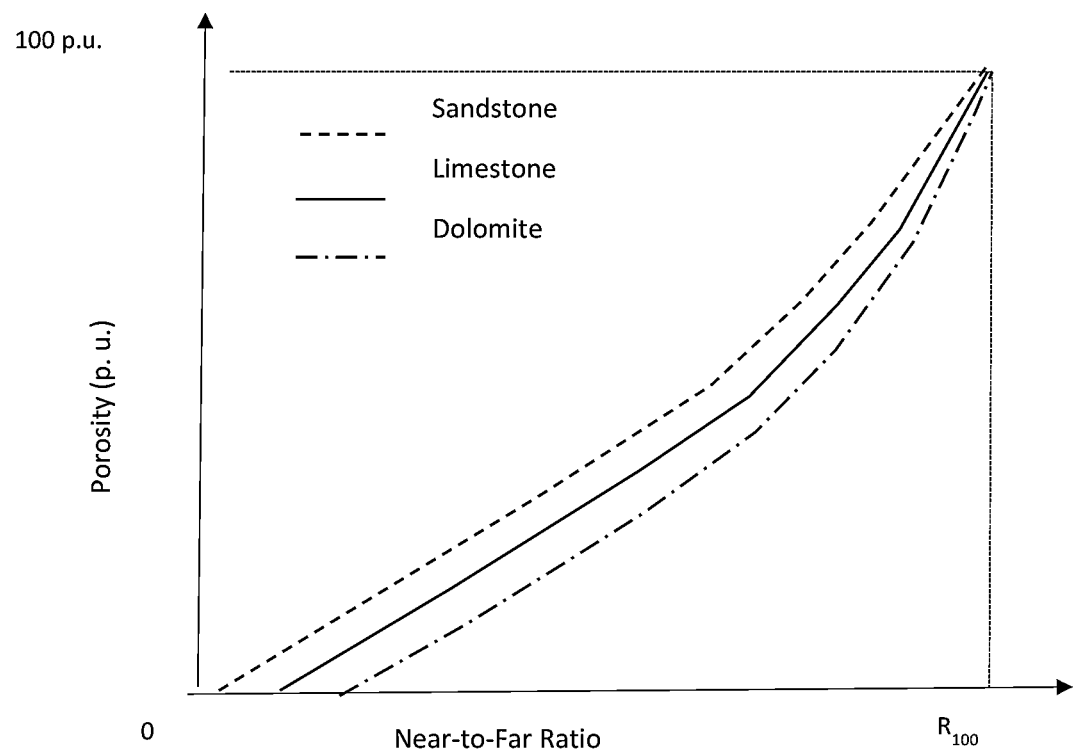
FIG. 1 is an exemplary chart showing the transform between the near-to-far ratio of neutron count rates and porosity for three different formation types.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. References are made in detail to embodiments of the present disclosure, examples of which are illustrated in the accompanying drawings. Similar or like reference numbers may be used in the drawings and may indicate similar or like elements.

The features described herein may be embodied in different forms and are not to be construed as being limited to the embodiments described herein. Rather, the embodiments described herein and depicted in the drawings have been provided so that this disclosure will be thorough and complete and will convey the full scope of the disclosure to one of ordinary skill in the art, who may readily recognize from the following description that alternative embodiments exist without departing from the general principles of the disclosure.

Therefore, the scope of the disclosure is defined not by the detailed description, but by the claims and their equivalents, and all variations within the scope of the claims and their equivalents are to be construed as being included in the disclosure.

In this disclosure, unless otherwise noted, a detector in refers to is a dual-function detector that can detect both neutrons and gamma rays. Such a detector employs scintillation crystals such as $Cs_2LiYCl_6$ (CLYC) or $Cs_2LiLaBr_6$ (CLLB) and associated electronics, e.g., PMT. The detectors may be actively cooled or not actively cooled when deployed downhole. For example, a detector using CLLB and high-temperature PMT can be used at a high temperature without additional cooling.

Figure 3A:
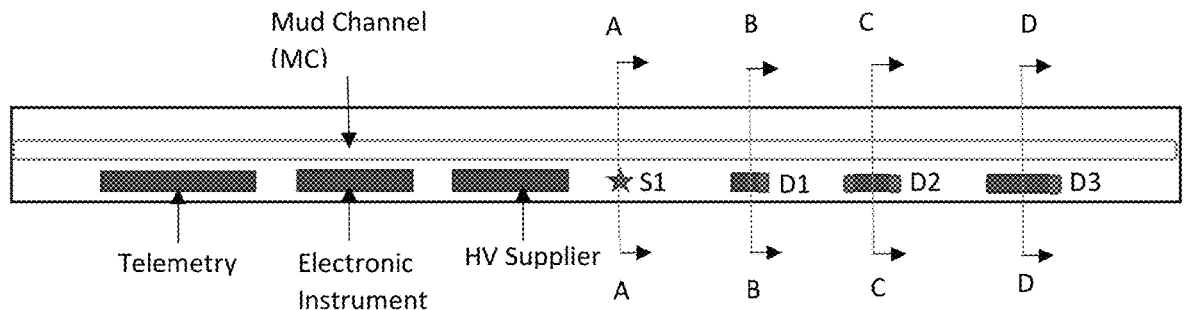
FIG. 3A, FIG. 3B, FIG. 3C, and FIG. 3D illustrate four exemplary configurations of a nuclear logging tool having one neutron source (S1) and three detectors (D1, D2, and D3) disposed along the longitudinal direction of the housing of the tool.

FIGS. 3A to 3D are schematic illustrations (not to scale) of four exemplary configurations of a cylindrical nuclear logging tool having a neutron source (S1) and three dual-function detectors (D1, D2, D3) disposed along the housing of the logging tool suitable for logging-while-drilling (LWD) operations. A mud channel (MC) is disposed along the axis of the logging tool while the detectors are eccentrically disposed along the longitudinal direction of the tool. FIG. 3A also shows a high voltage power supply (HV), an electronic instrument, e.g., a controller, for sending instructions, receiving and processing data from the neutron source and the detectors, as well as a telemetry for transmitting data between the logging tool and surface. The high voltage power supply provides power to detectors (D1, D2, D3) and to the pulsed neutron source (S1). The power supply, the electronic instrument, and telemetry are required but not shown in FIGS. 3B to 3D for simplicity.

As shown in the figures, a1 is the near detector that has the shortest distance in longitudinal direction to the neutron source, D3 is the far detector having the longest longitudinal distance to the neutron source, and D2 is the middle detector that has a longitudinal distance that is in the middle.

Figure 3B:
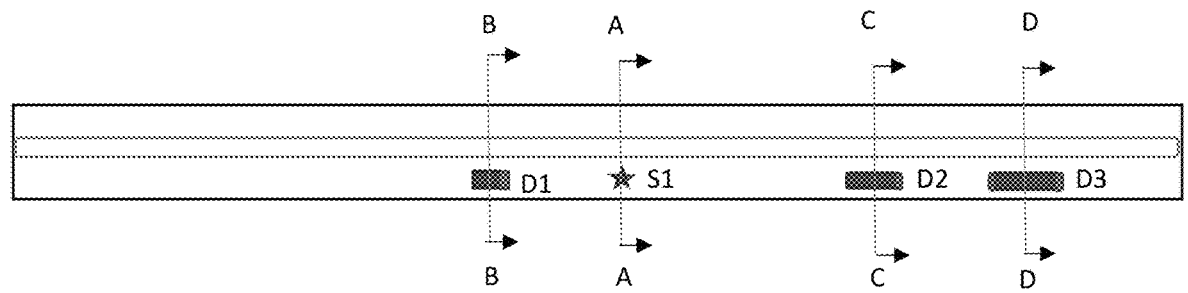
Figure 3C:
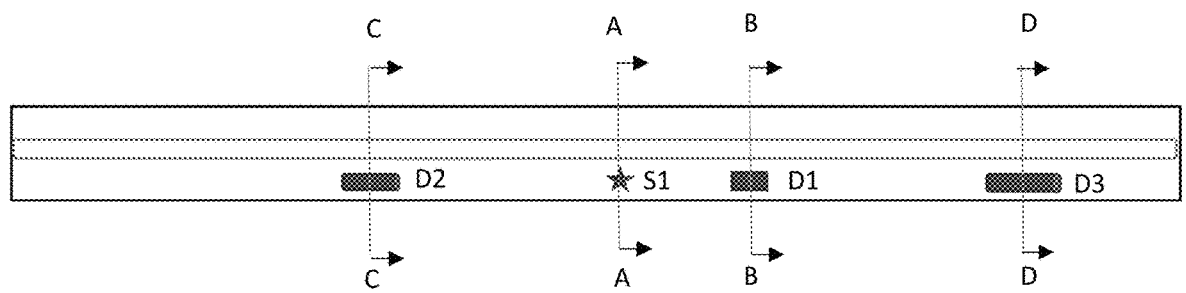
Figure 3D:
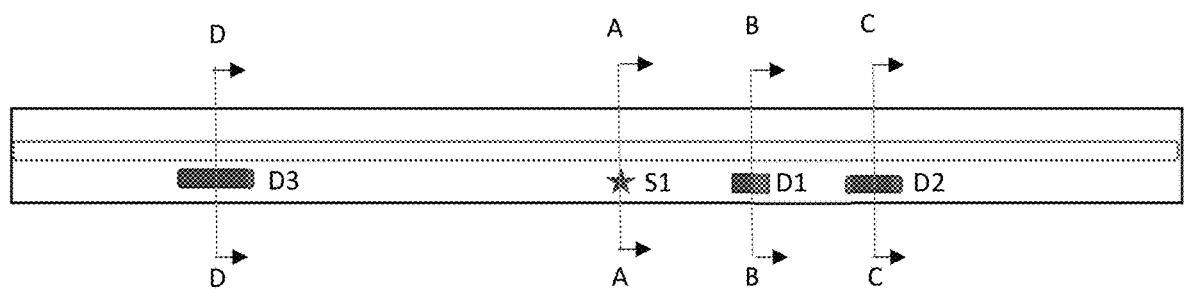

In FIG. 3A, all three detectors reside on one side of the neutron source along the logging tool. The one side can be either the proximal side or the distal side of the neutron source. The proximal side is the side of the nuclear logging tool 200 that is closer to the surface when it is deployed downhole while the distal side is farther away from the surface. The high voltage power supply provides power to detectors (D1, D2, D3) and to the pulsed neutron source (S1). The signals from detectors are processed by the electronic instruments and measurements/data are collected and transmitted by telemetry. In FIGS. 3B, 3C, and 3D, both the distal side and the proximal side of the neutron source has at least one detector disposed thereto.

In wireline logging, the tool can be installed in a sonde, which does not contain a mud channel. Detectors can be installed either along or off the axis of the tool body.

Power and control signals can also be provided to the logging tool from the surface while data from the logging tool can be transmitted to the surface via the wireline cable.

The neutron source S1 in each logging tool depicted in FIGS. 3A to 3D is a pulsed neutron generator. The pulsed neutron source may be a Deuterium-Tritium (D-T) pulsed neutron generator, which can operate in a variety of pulse schematics (e.g., frequency, duty time) in a pulse mode. For example, the frequency of neutron pulses may be about 10 kHz (the period is 100 μs) and the neutron duty time may be about 20 μs. In another embodiment, the frequency of neutron pulses may be about 1 kHz (the period is 1000 μs) and neutron duty time may be 50 μs. Neutrons from a D-T neutron generator has an initial energy of about 14.1 MeV.

The neutron source S1 and detectors D1, D2, and D3 as depicted in FIGS. 1A-1D only show their relative positions along the longitudinal direction of the housing of the tool 200 but not their positions in the radial direction in a cross-section of the tool housing.

Figure 2:
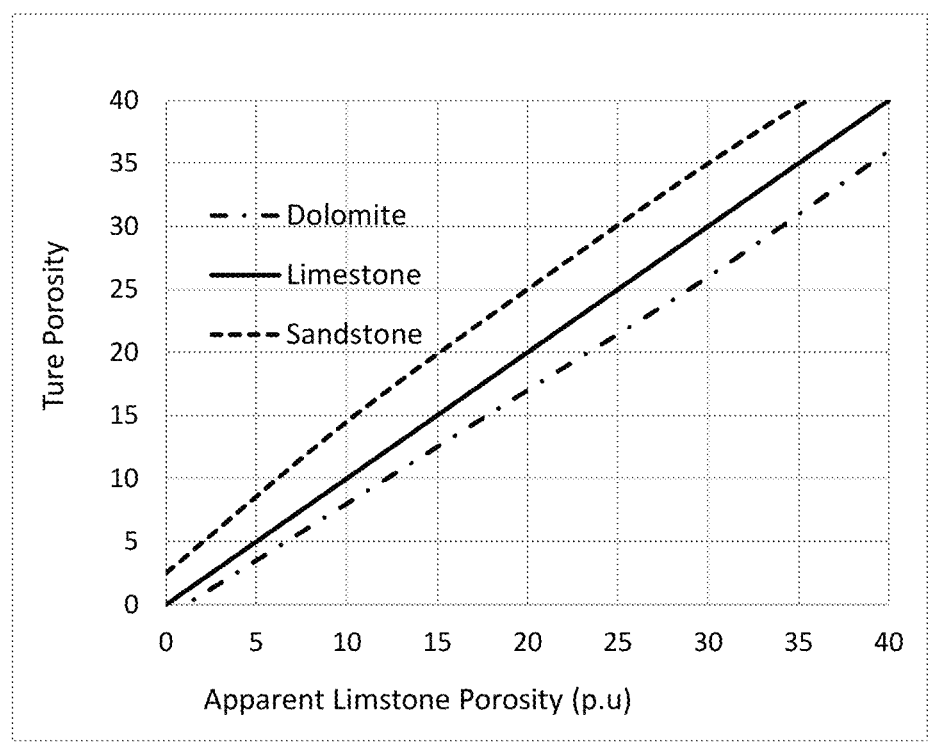
FIG. 2 shows the deviation between the true porosity and the apparent limestone porosity using the standard limestone ratio-to-porosity transform for three formation types.
Figure 4A:
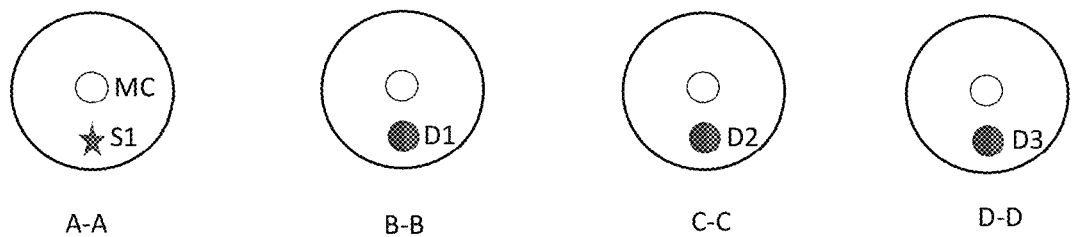
FIG. 4A, FIG. 4B, and FIG. 4C show cross-sectional views of exemplary nuclear logging tools having S1, D1, D2, and D3.
Figure 4B:
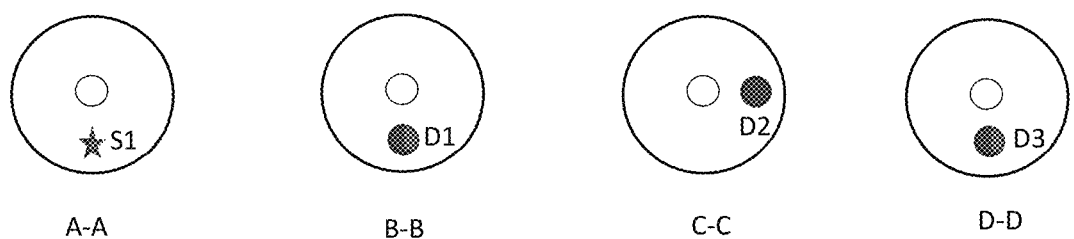
Figure 4C:
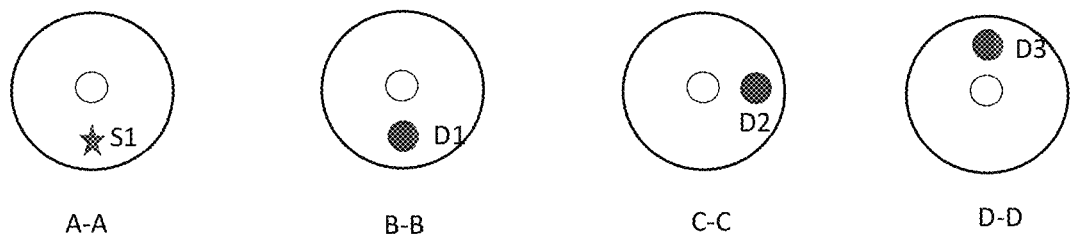

In certain embodiments, S1, D1, D2, and D3 can be disposed at the same radial or different radial directions, i.e., having the same or different toolface angles when deployed in the formation. FIGS. 4A, 4B, and 4C show exemplary cross-sectional views in the directions of A-A, B-B, C-C, and D-D as shown in FIGS. 3A to 3D. S1, D1, D2, and D3 in FIG. 2A are disposed at same toolface angle. In FIG. 4B, however, S1, D1, and D3 have the same toolface angle while D2 is at a different toolface angle. In FIG. 4C, S1 and a1 have the same toolface angle while each of D2 and D3 has a different toolface angle.

Other embodiments of the logging tool may have two detectors or more than three detectors, e.g., four detectors. Further, different detectors may be installed at two or more different toolface angles. Having detectors at different toolface angles allows detectors to preferentially receive neutrons and gamma-rays at certain incident angles from the formation. It also increases the detection efficiency of neutrons and gamma rays by increasing the total count rate of all the detectors.

Figure 5A:
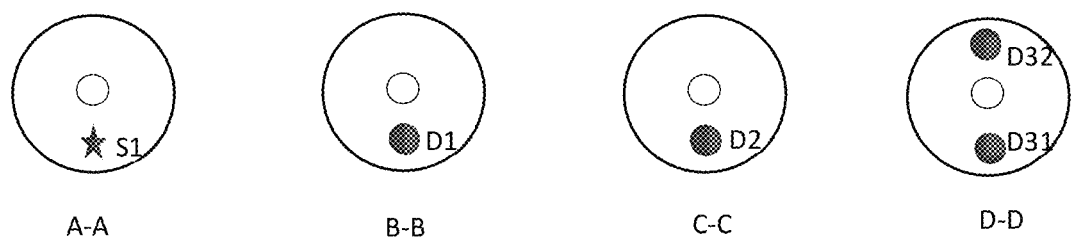
FIG. 5A and FIG. 5B show cross-sectional views of exemplary nuclear logging tools having four (D1, D2, D31, D32) and six detectors (D1, D21, D22, D31, D32), respectively.
Figure 5B:
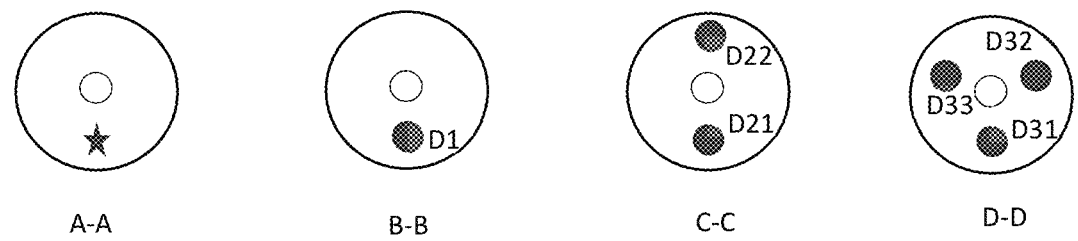

Further, more than one detectors can be installed at the substantially the same distance from the neutron source. E.g., as shown in FIG. 5A, a pair of two detectors are installed at one position on the cylindrical sub that are of the same first distance to the neutron source in the axial direction but at two different angles radially, e.g., two different two face angels. Or as shown in FIG. 5B, a first pair of two detectors are installed at a first distance from the neutron source and a second pair of three detectors are installed at a second distance from the neutron source. The second distance is further from the neutron source than the first distance. So the first pair of two detectors as a whole acts as the middle detector while the second pair of three detectors as a whole acts as the far detector. By using two near detectors instead of one, the neutron source can be of a less powerful source, which may not be subject to stringent regulations as more powerful neutron sources are subject to. In addition, the count rate of individual detectors can separately be recorded and processed. The differences of various detectors in distance and in toolface angles can be used to obtain formation information in specific azimuthal directions.

In some embodiments, the logging tool 200 have multiple shields that can absorb neutrons and gamma-rays (not shown). The shields can be placed in the logging tool between the neutron source and the detectors so that the detectors receive neutrons and gamma-rays coming from the formation rather than traveling through the logging tool itself. Alternatively, the detectors can also be partially shielded by the shield material that absorb neutrons and gamma rays from certain directions.

The shield is made of or contains one or more materials that can effectively attenuate both thermal neutrons and gamma rays. The shield material can contain materials chosen from heavy elements having high thermal neutron absorption cross sections, including metals such as gadolinium (Gd), samarium (Sm), metal oxides such as $Gd_2O_3$, $Sm_2O_3$, $B_2O_3$, alloys containing Gd or Sm with other heavy metals Fe, Pb, or W, or materials containing boron, such as tungsten borides (WB, $WB_2$, etc.).

The shield may be a stand-alone metal piece inserted in the logging tool, or an integral part of the detector casing. For example, the portion of the detector casing facing inward to the logging tool can be made of the shield material while the portion facing the formation is made of a material that is transparent to neutrons and gamma rays, forming a window that neutrons and gamma rays can travel through. As such, neutrons and gamma-rays from certain incident angles may be absorbed by the shield material while those travel through the window are received by the detector. Therefore, the detector can be more sensitive to certain incident angles by adjusting the size and orientation of the window in the detector casing. During operation, data collected by various detectors may produce direction-specific formation properties, which can be used to guide directional drilling.

Figure 6A:
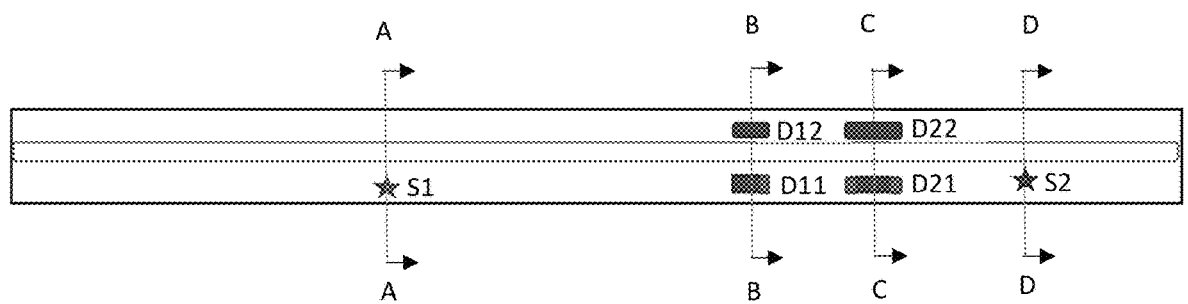
FIG. 6A is a further exemplary embodiment of the nuclear logging tool having two neutron sources (S1, S2) and four detectors (D11, D12, D21, D22)
Figure 6B:
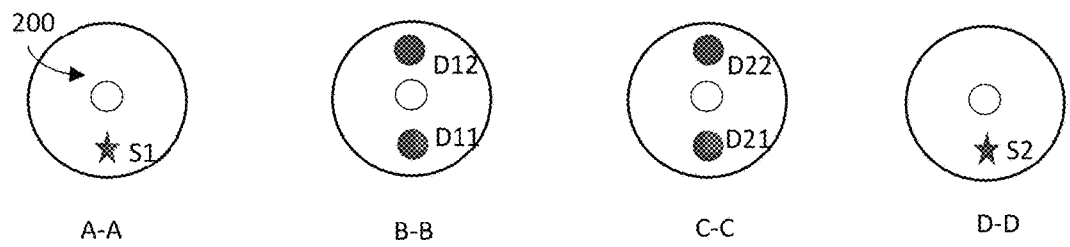
FIG. 6B provides cross-sectional views of this embodiment.

The nuclear logging tool may have more than one neutron sources. FIGS. 6A and 6B show a further embodiment of the logging tool having two neutron sources (S1 and S2), one at the proximal end and the other at the distal end while four detectors (D11, D12, D21, and D22) are arranged between S1 and S2. Alternatively, S1 and S2 can be arranged in tandem and disposed near one end of the logging tool while D11, D12, D21, and D22 arranged in tandem near the other end, as the engineering considerations require.

The pair of detectors D11 and D12 (as well as D21 and D22) are disposed at substantially the same distance from S1 or S2. As indicated before, having more than one detectors at a certain distance increase the count rate at that distance so that a less powerful neutron source may be viable. The count rate of one far detector may be too low to provide reliable measurement data. By using two or more far detectors, the count rate can be significantly increased so that reliable measurement results can be obtained by processing data from the multiple far detectors as a whole.

In further variation of the embodiment of FIGS. 5A and 5B, one may use two detectors (D1 and D2) instead of four detectors (D11, D12, D21, D22) between S1 and S2. S1, S2, D1, and D2 may have the same of different tool face angels. When the neutron sources and detectors have the same toolface angle, the measurement covers the same sector in the formation at any given time. When the neutron sources and detectors may have different toolface angles, the data generated in D1 and D2 reflect different sectors of the formation, which can reveal differences amongst various formation sectors at any given time by comparing the measurements from D1 and D2.

In some embodiments, S1 and S2 can be turned ON or OFF simultaneously. Doing so increases the count rate of D1 and D2, thereby reducing the statistical measurement uncertainty.

Figure 7:
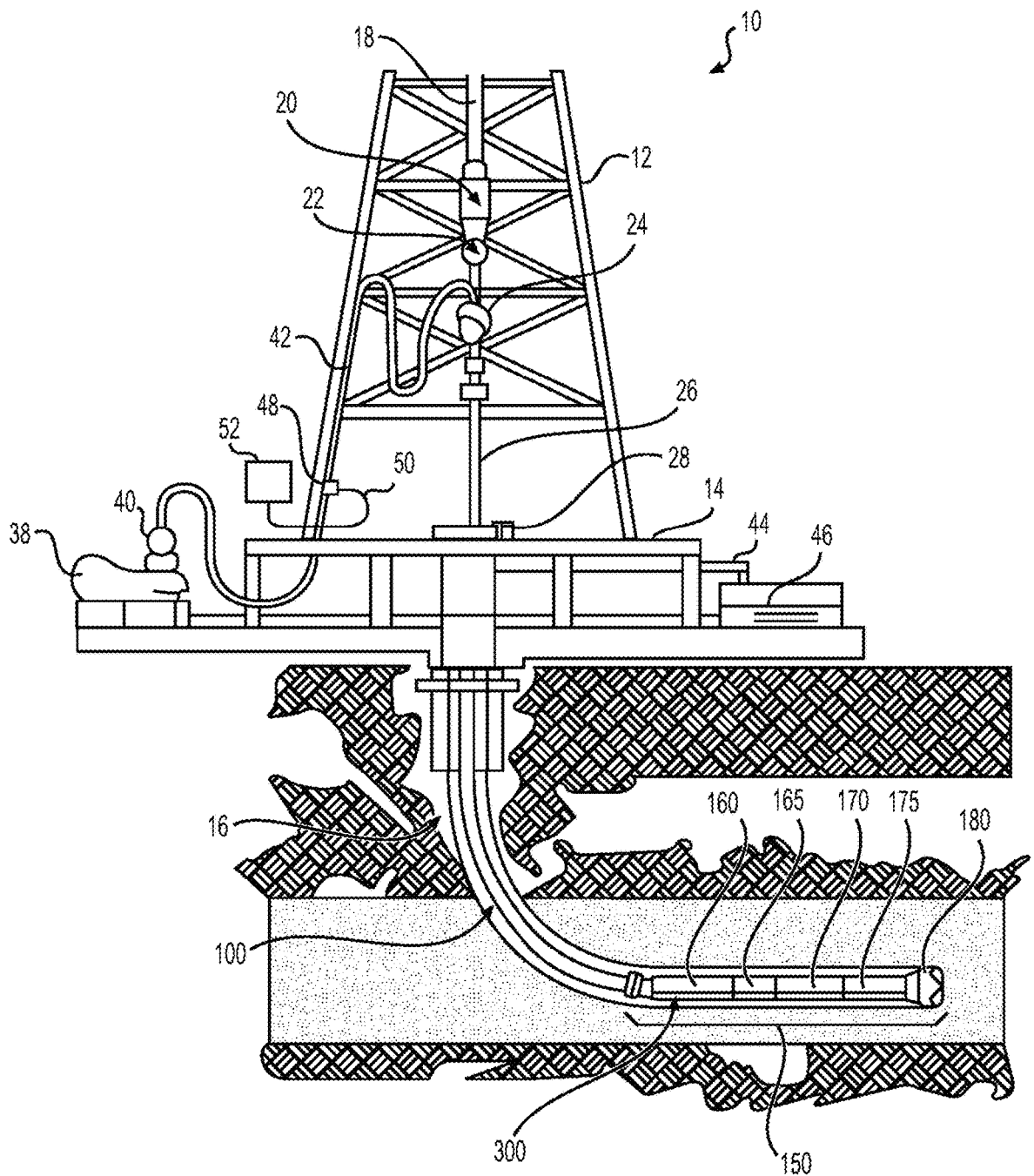
FIG. 7 is a block diagram of an exemplary drilling system that implements an embodiment of the current disclosure.

The logging tool 200 can be a part of a wireline logging tool or be included in a downhole assembly as a LWD logging tool in a drilling operation. FIG. 7 is a diagram of an oil drilling system 10 used in the directional drilling of borehole 16. The oil drilling system 10 may be used for drilling on land as well as beneath the water. The borehole 16 is drilled into the earth formation using a rotary drilling rig that includes a derrick 12, drill floor 14, draw works 18, traveling block 20, hook 22, swivel joint 24, kelly joint 26 and rotary table 28. A drill string 100 includes a plurality of drill pipes that are serially connected and secured to the bottom of the kelly joint 26 at the surface. The rotary table 28 is used to rotate the entire drill string 100 while the draw works 18 is used to lower the drill string 100 into the bore hole 16 and apply controlled axial compressive loads. The bottom whole assembly 150 is disposed at the distal end of the drill string 100.

The drilling fluid (also referred to as mud) is usually stored in mud pits or mud tanks 46, and is transferred using a mud pump 38, which forces the drilling fluid to flow through a surge suppressor 40, then through a kelly hose 42, and through the swivel joint 24 and into the top of the drill string 100. The drilling fluid flows through the drill string 100 at about 150 gallons per minute to about 600 gallons per minute and flows into the bottom whole assembly 150. The drilling fluid then returns to the surface by traveling through the annular space between the outer surface of the drill string 100 and the bore hole 16. When the drilling fluid reaches the surface, it is diverted through a mud return line 44 back to the mud tanks 46.

The pressure required to keep the drilling fluid in circulation is measured by a pressure sensitive transducer 48 on the kelly hose 42. The pressure sensitive transducer detects changes in pressure caused by the pressure pulses generated by a pulser. The magnitude of the pressure wave from the pulser may be up to 500 psi or more. The measured pressure is transmitted as electrical signals through transducer cable 50 to a surface computer 52, which decodes and displays the transmitted information. Alternatively, the measured pressure is transmitted as electrical signals through transducer cable 50 to a decoder which decodes the electrical signals and transmits the decoded signals to a surface computer 52 which displays the data on a display screen.

As indicated above, the lower part ("distal part") of the drill string 100 includes the bottom hole assembly (BHA) 150, which includes a non-magnetic drill collar with a MWD system (MWD assembly or MWD tool) 160 installed therein, logging-while drilling (LWD) instruments sub 165 containing LWD instruments, a downhole motor 170, a near-bit measurement sub 175, and the drill bit 180 having drilling nozzles (not shown). The drilling fluid flows through the drill string 100 and is output through the drilling nozzles of the drill bit 180. During the drilling operation, the drilling system 10 may operate in the rotary mode, in which the drill string 100 is rotated from the surface either by the rotary table 28 or a motor in the traveling block 20 (i.e., a top drive). The drilling system 10 may also operate in a sliding mode, in which the drill string 100 is not rotated from the surface but is driven by the downhole motor 170 rotating the drill bit 180. The drilling fluid is pumped from the surface through the drill string 100 to the drill bit 180, being injected into an annulus between the drill string 100 and the wall of the bore hole 16. The drilling fluid carries the cuttings up from the bore hole 16 to the surface.

In one or more embodiments, the MWD system 160 may include a pulser sub, a pulser driver sub, a battery sub, a central storage unit, a master board, a power supply sub, a directional module sub, and other sensor boards. In some embodiments, some of these devices may be located in other areas of the BHA 150. One or more of the pulser sub and pulser driver sub may communicate with the pulser 300, which may be located below the MWD system 160. The MWD system 160 can transmit data to the pulser 300 so that the pulser 300 generates pressure pulses.

The non-magnetic drill collar houses the MWD system 160, which includes a package of instruments for measuring inclination, azimuth, well trajectory (bore hole trajectory), etc. The nuclear logging tool 200 and associated electronic components may be located in LWD instrument sub 165. The nuclear logging tool 200 and other well logging instruments may be electrically or wirelessly coupled together, powered by a battery pack or a power generator driven by the drilling fluid. All information gathered may be transmitted to the surface via in the form of pressure pulses generated by the pulser 300 through the mud column in the drill string.

The near-bit measurement sub 175 may be disposed between the downhole motor 170 and drill bit 180. The nuclear logging tool 200 may alternatively been installed in the near-bit measure sub 175 to provide more accurate real-time formation parameters to guide directional drilling. The data may be transmitted through the cable embedded in the downhole motor 170 to the MWD system 160 in the bottom whole assembly 150.

Figure 8:
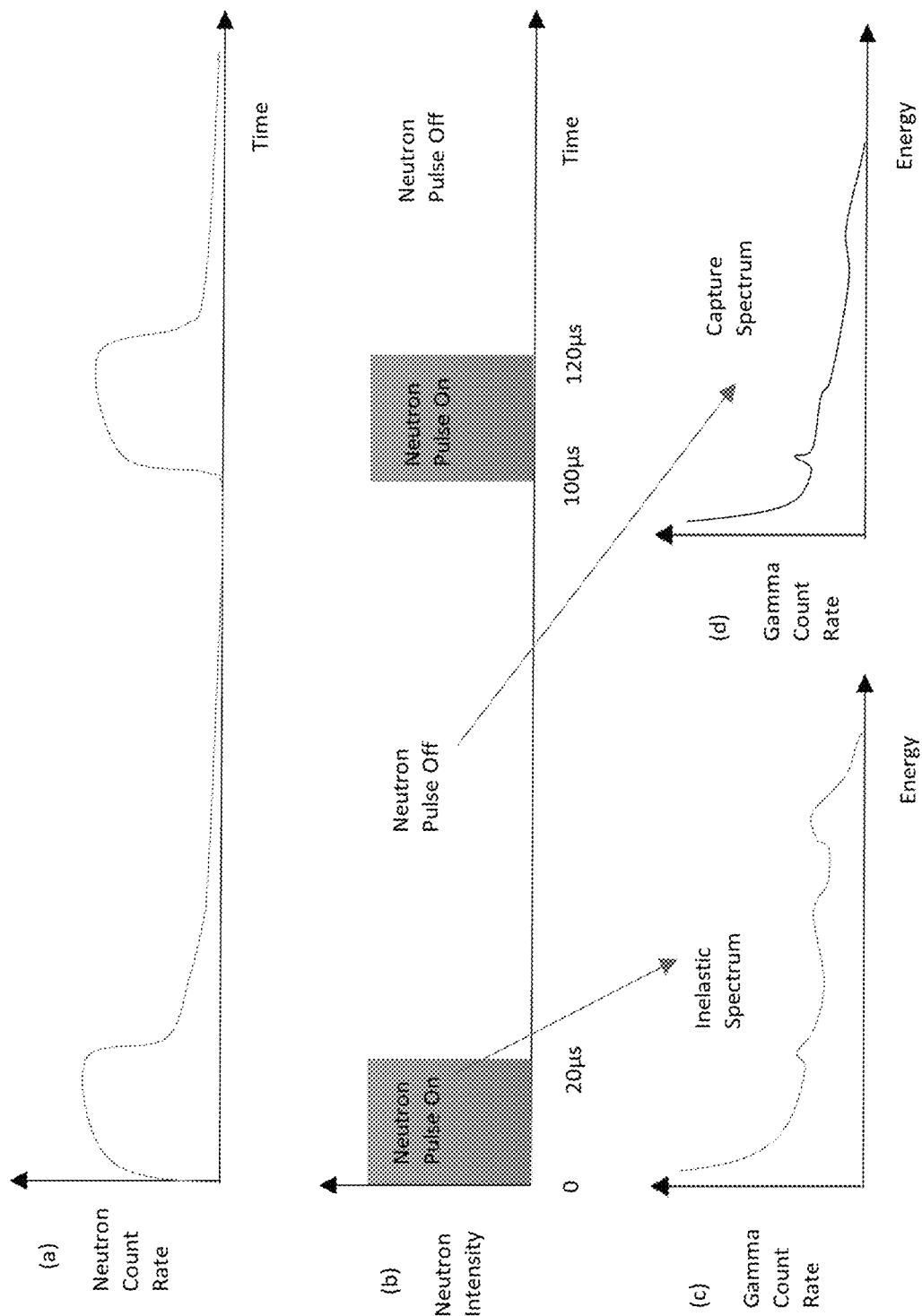
FIG. 8 shows timing of neutron pulses, neutron count rates, as well as energy spectra for gamma rays induced by inelastic neutron scattering and for gamma rays induced by thermal neutron capture reactions.

In one embodiment of the current disclosure, a variety of formation parameters obtained using a logging tool having a D-T neutron generator and three dual-function detectors. FIG. 8 shows schematics of neutron pulses, neutron count rates, as well as inelastic spectrum and capture spectrum of neutron-induced gamma rays. The frequency of neutron pulses is 10 kHz (the period is 100 μs) and the neutron duty time is 20 μs, as shown in FIG. 8, panel (b).

The neutron count rates measured from each of the three detectors, shown in FIG. 8, panel (a), are utilized to obtain formation porosity. Neutrons from three detectors may be further separated according to whether the neutron pulse is ON or OFF, which serves as a coincident or anti-coincident signal to neutrons from the three detectors so that during the neutron pulses (neutron pulse is ON), neutrons are recorded mainly as fast neutrons.

Between the neutron pulses (neutron pulse is OFF), neutrons are recorded as thermal neutrons. Fast neutrons and thermal neutrons recorded at three detectors can be used to obtain fast neutron space distribution and thermal neutron space distribution. The neutrons from each detector may also be recorded together. In that case, all neutrons (from thermal neutrons to fast neutrons) are used to obtain the neutron space distribution.

Gamma rays received at three detectors may be further separated according to whether the neutron pulse is ON or OFF, which serves as a coincident or anti-coincident signal to gamma rays from the three detectors so that during the neutron pulses (neutron pulse is ON), gamma rays are mainly recorded as inelastic energy spectrum, shown in FIG. 8, panel (c). Between the neutron pulses (neutron pulse is OFF), gamma rays are recorded as capture energy spectrum, shown in FIG. 8, panel (d). Proper time windows are selected so that gamma rays measured in the capture time window are from thermal neutron capture reactions and most gamma rays measured in the inelastic time window are from fast neutron inelastic scattering.

Backgrounds at detectors may be measured while the neuron generator is OFF for some time and can be subtracted from the total signals of either neutrons or gamma rays. Neutron background measured during the neutron pulses may be further subtracted to get "pure" fast neutrons by using a small percentage of the measured neutrons between the neutron pulses. Similarly, the capture gamma rays measured during the neutron pulses may be further subtracted to get "pure" inelastic spectrum by using a small percentage of the measured capture spectrum between neutron pulses.

Figure 9:
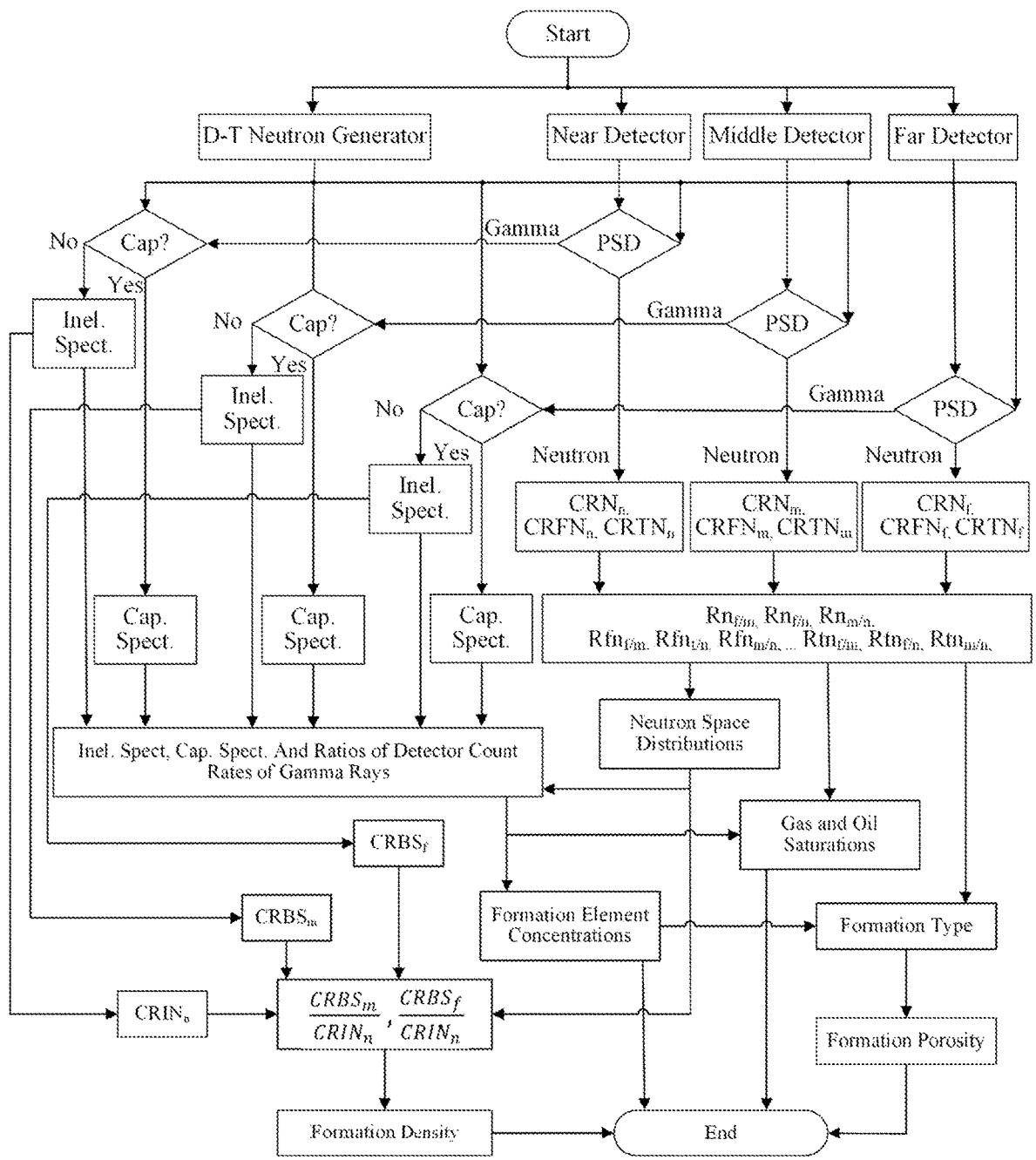
FIG. 9 is a flow diagram showing exemplary methods to obtain various formation parameters.

FIG. 9 is an exemplary workflow showing the steps in the processing of data from the logging tool 200 having one D-T neutron generator and three detectors—the near detector, the middle detector, and the far detector. First, signals of from neutrons and neutron-induced gamma rays from three detectors are distinguished using a pulse shape discrimination (PSD) technique. The neutron signals from the three detectors are then utilized to obtain the total count rates ($CRN_n$, $CRN_m$, $CRN_f$), fast neutron count rates ($CRFN_n$, $CRFN_m$, $CRFN_f$), thermal neutron count rates ($CRTN_n$, $CRTN_m$, $CRTN_f$), which are further utilized to obtain the neutron porosity by using three ratios ($Rn_{f/m}$, $Rn_{f/n}$, $Rn_{m/n}$), and fast neutron distribution (e.g., $Rfn_{f/m}$, $Rfn_{f/n}$, $Rfn_{m/n}$) and thermal neutron distribution (e.g., $Rtn_{f/m}$, $Rtn_{f/n}$, $Rtn_{m/n}$).

The fast neutron space distribution and thermal neutron space distribution may be utilized in the calculation of formation element concentrations using inelastic spectrum and capture spectrum. They may also be utilized to obtain more accurate oil and gas saturations. Examples for obtaining formation porosity, density, element concentrations, as well as gas and oil saturations are provided below.

As shown in FIG. 9, the count rates of neutrons (CRN) measured during and between neutron pulses from the near detector, the middle detector, and the far detector ($CRN_n$, $CRN_m$, $CRN_f$) are utilized to obtain the formation porosity ($\phi$) by using the ratios of the count rates.

The far-to-middle ratio ($Rn_{f/m}$), the far-to-near ratio ($Rn_{f/n}$) and the middle-to-near ratio ($Rn_{m/n}$) can be obtained by using Equations 1, 2, and 3, respectively. Since the three detectors are placed at different distances from the neutron source, they have different depth of investigations. As a result, near-wellbore environments, such as borehole fluid, cement, etc., have different impacts on the three ratios. The $Rn_{f/m}$ is more sensitive to the formation, $Rn_{m/n}$ is more sensitive to the near-wellbore changes and $Rn_{f/n}$ is sensitive to both.

$$Rn_{f/m} = \frac{CRN_f}{CRN_m} \quad (1)$$

$$Rn_{f/n} = \frac{CRN_f}{CRN_n} \quad (2)$$

$$Rn_{m/n} = \frac{CRN_m}{CRN_n} \quad (3)$$

The formation porosity $\phi_n$ can be obtained by first using $Rn_{m/n}$ and/or $Rn_{f/n}$ to correct $Rn_{f/m}$, and then use the corrected far-to-middle ratio $Rnc_{f/m}$ to obtain the formation porosity for a specific formation, e.g., sandstone, limestone or dolomite. Equations (4)-(6) illustrate this algorithm, AR being the correction value.

$$Rnc_{f/m} = Rn_{f/m} + \Delta R \quad (4)$$

$$\Delta R = f_1(Rn_{f/m}, Rn_{f/n}, Rn_{m/n}) \quad (5)$$

$$\Phi_n = f_2(Rnc_{f/m}) \quad (6)$$

The formation porosity $\Phi_n$ may also be obtained using the three ratios of count rates of capture gamma rays count rates obtained by the three detectors, according to an algorithm similar to that described in Equations 1-6.

The formation porosity $\Phi_n$ may also be obtained by combining the two porosities obtained by neutrons and capture gamma rays, respectively. Or obtained directly from the three ratios of neutrons and three ratios of capture gamma rays using other methodologies.

Mineralogy measurement can be obtained by measuring the energy spectrum of gamma rays from both neutron inelastic scattering and neutron capture reactions, using the same tool.

The gamma rays detected by each detector may be recorded either in two separate energy spectra (inelastic spectrum and capture spectrum) or in one energy spectrum (a total or combined spectrum). In either case, the elements can be identified, relative yields of characteristic gamma rays from those elements can be obtained, so as the element concentrations. Based on the elemental profile of the formation, the mineralogy of the formation, aka, formation type, can be determined. The formation type is then used to calibrate or adjust the neutron count ratios to obtain the true porosity of the formation as the logging tool advances.

Figure 12:
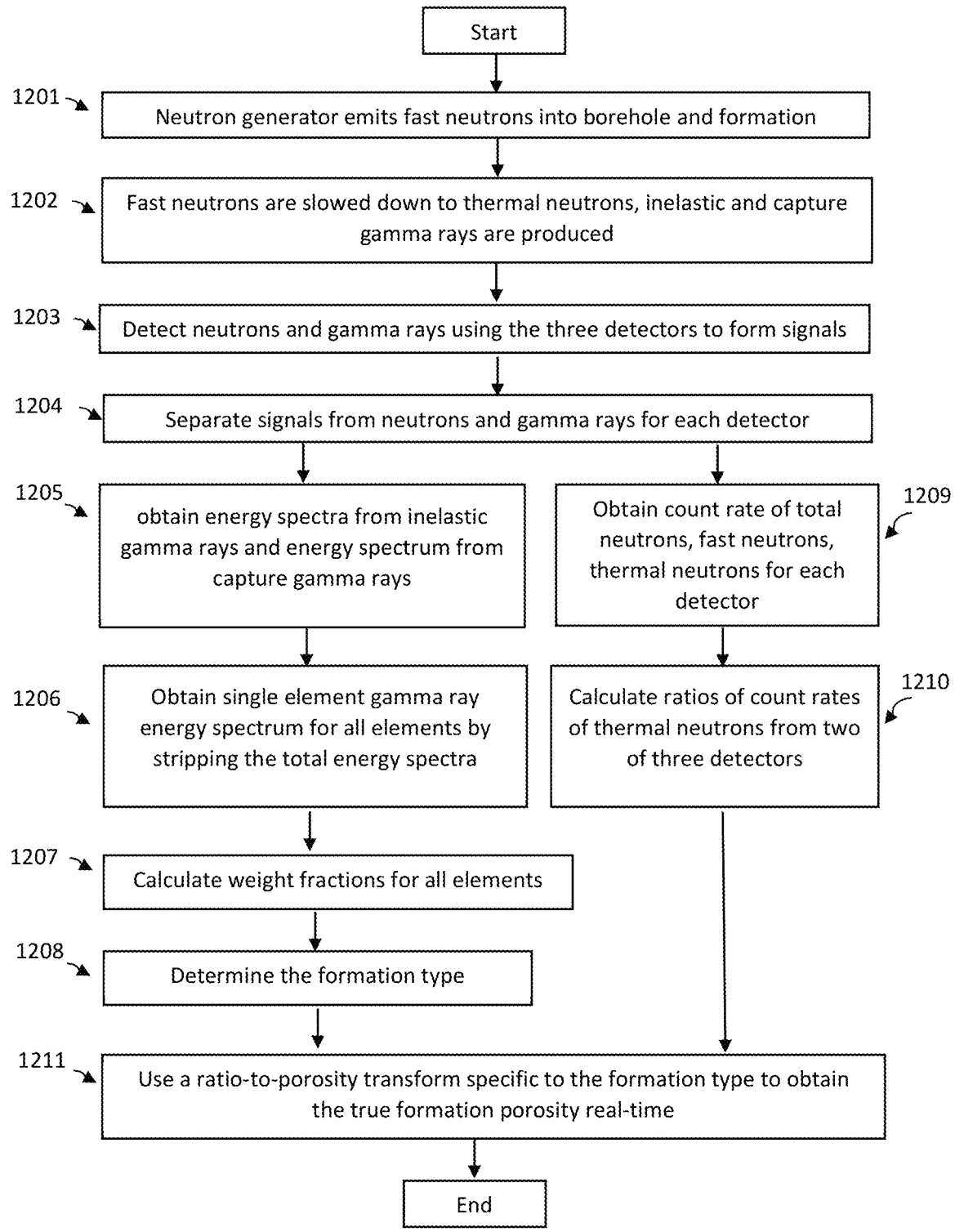
FIG. 12 shows a workflow for real-time estimation of true formation porosity according to an embodiment of the present disclosure.

FIG. 12 provides another workflow detailing the steps to obtain the real-time true formation porosity using a logging tool having a neutron generator and three dual function detectors.

In Step 1201, the neutron generator in the logging tool emits fast neutrons into the borehole and the formation. In Step 1202, fast neutrons are slowed down by the formation to generate thermal neutrons. Inelastic gamma rays are initiated by fast neutron scattering. Capture gamma rays are initiated by thermal neutron capture reactions. In Step 1203, the neutrons and the gamma rays are scattered back and detected by the three detectors in the logging tool. In Step 1204, signals from neutrons and gamma rays for each of the three detectors are separated using, e.g., the PSD technique.

Figure 10A:
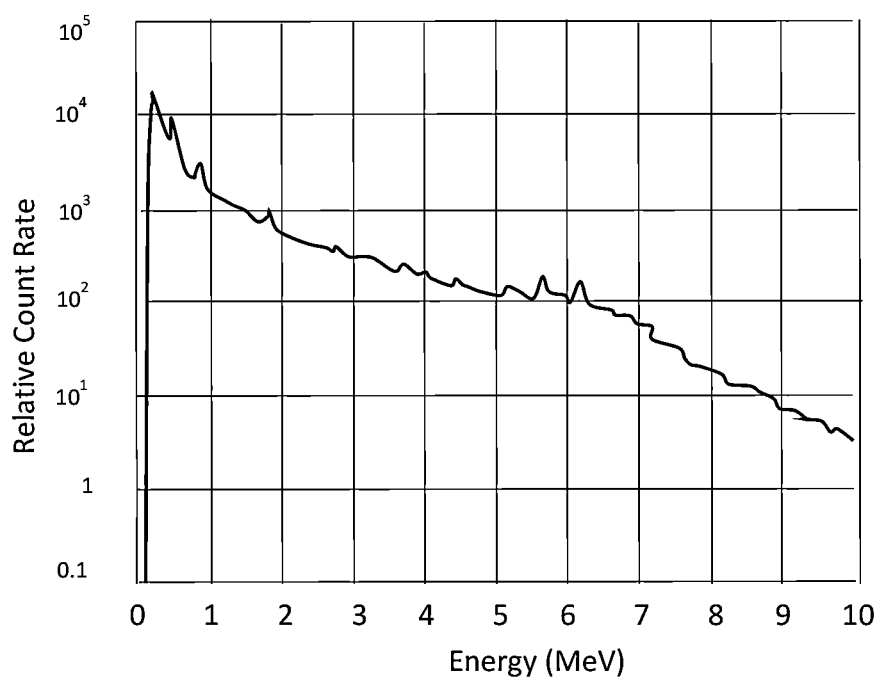
FIG. 10A shows an exemplary gamma ray energy spectrum from fast neutron inelastic scattering.
Figure 10B:
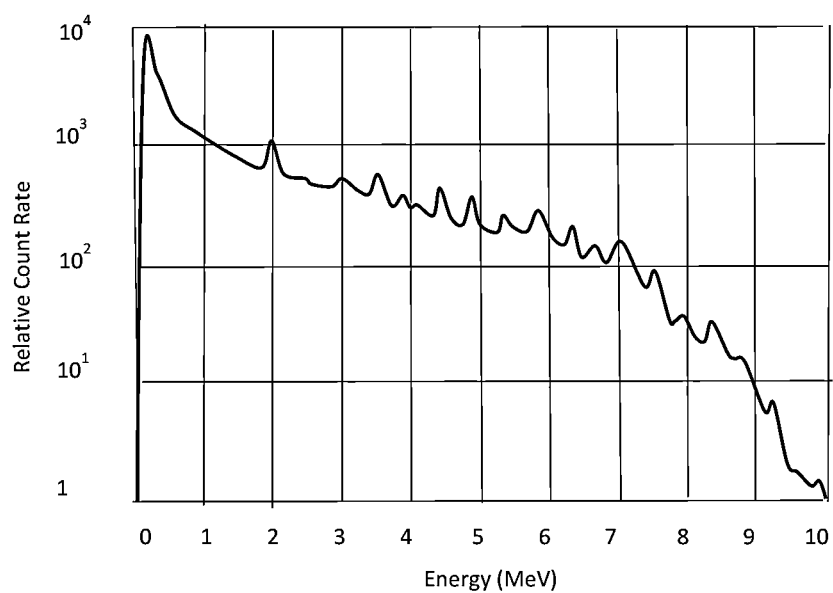
FIG. 10B shows an exemplary gamma ray energy spectrum from thermal neutron capture reactions.

In Step 1205 gamma rays from fast neutron inelastic scattering (aka. inelastic gamma rays) are separated from gamma rays from thermal neutron capture reactions (aka capture gamma rays). Most of inelastic gamma rays are initiated during the neutron pulses while capture gamma rays are initiated between the neutron pulses. A signal from the neutron generator is synchronized with the high voltage signal on the target of the neutron generator. The signal is then utilized as a coincidence signal or an anticoincidence signal for gamma rays after they have been separated from neutrons using the PSD technique. As such, gamma rays captured during the neutron pluses (coincidence events) are identified as inelastic gamma rays while gamma rays between two neutron pulses (anti-coincidence events) are identified as capture gamma rays. The inelastic gamma rays and the capture gamma rays are recorded separately in two different energy spectra for each of the detectors. FIG. 10A shows an exemplary inelastic gamma ray energy spectrum from fast neutron inelastic scattering while FIG. 10B shows an exemplary capture gamma ray energy spectrum from thermal neutron capture reactions.

Each of the inelastic gamma ray energy spectrum and the capture gamma ray energy spectrum is a combination of signals from a number of elements in the formation superimposed on each other. The inelastic gamma ray energy spectrum is a combination of energy spectra of gamma rays attributable to Mg, Fe, S, C, Al, Si, Ca, O, as well as background noise from the measurement tool (i.e., tool background). The capture gamma ray energy spectrum comprises thermal neutron capture gamma ray energy spectra of Mg, S, Ti, Al, K, Ca, Si, Gd, Fe, Cl, H, as well as the tool background. For the purpose of identifying the formation type, the combined energy spectrum needs to be stripped to estimate the concentration of some or all these elements in the formation.

Figure 11A:
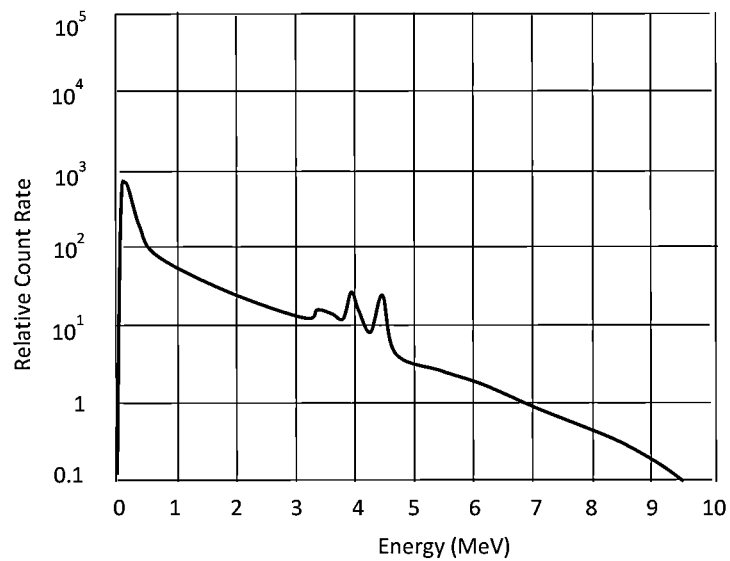
FIGS. 11A, 11B, 11C and 11D show gamma ray energy spectrum from neutron inelastic scattering on carbon, oxygen and Mg elements.
Figure 11B:
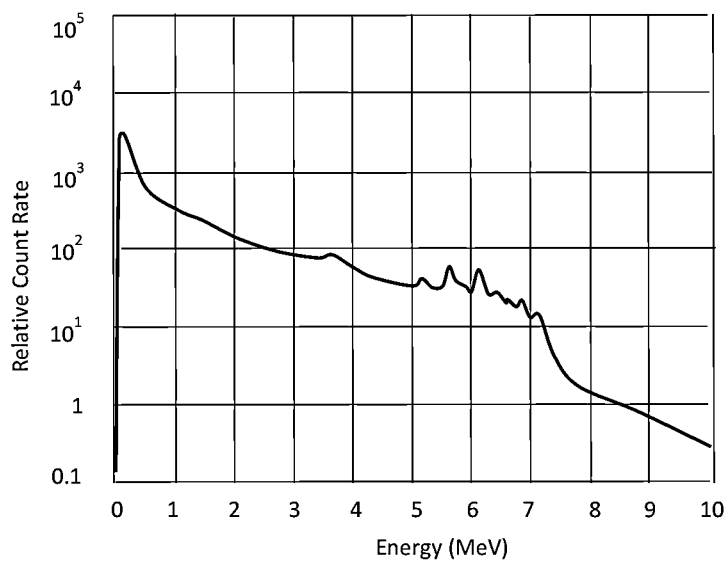
Figure 11C:
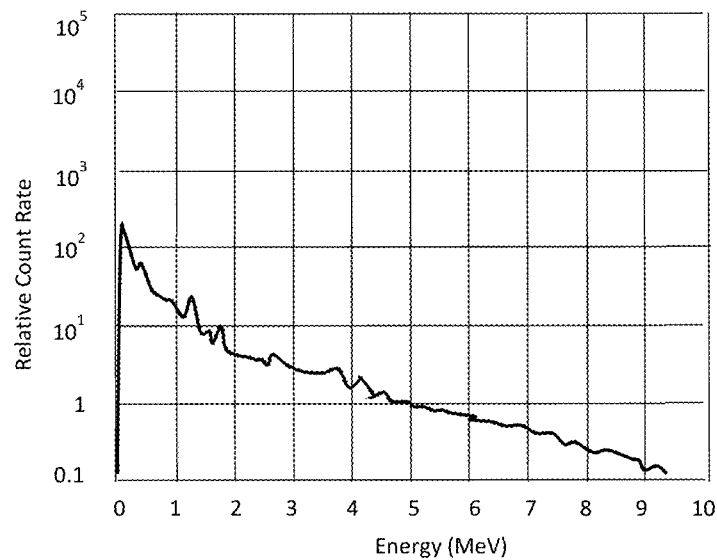
Figure 11D:
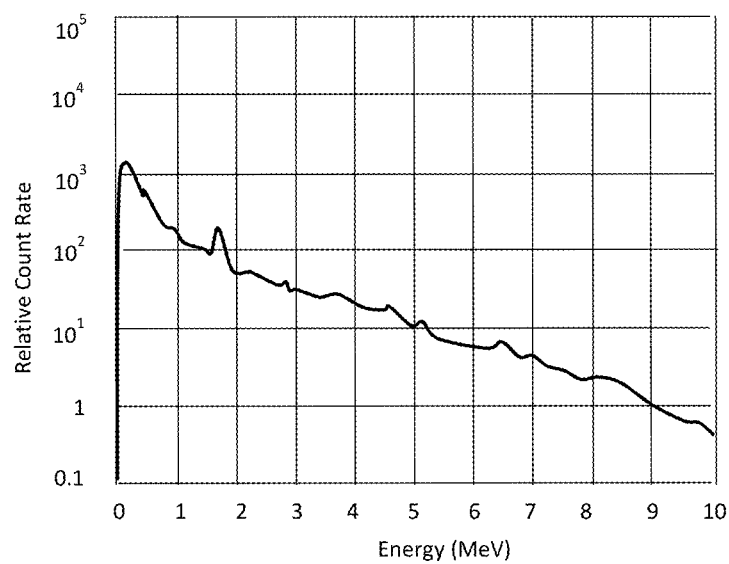
Figure 11E:
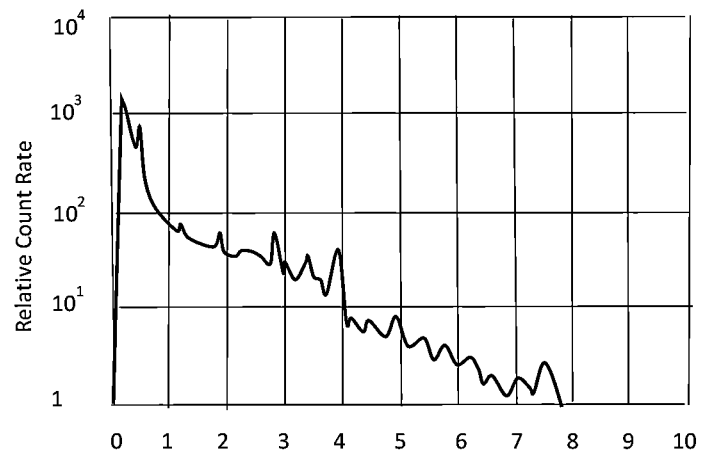
FIGS. 11E and 11F show gamma ray energy spectrum from thermal neutron capture on Mg and Ca elements, respectively.
Figure 11F:
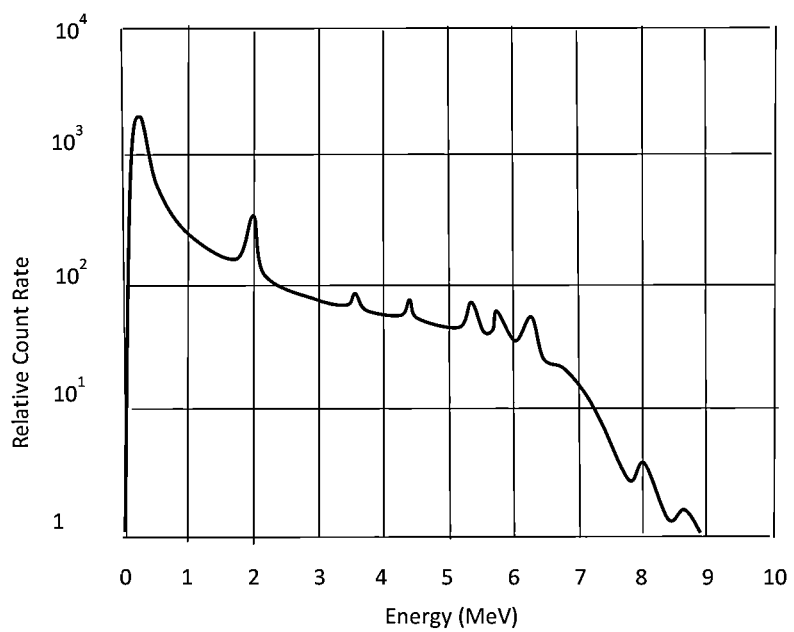

Step 1206 strips the inelastic gamma ray energy spectrum and the capture gamma ray energy spectrum to estimate the concentration of these elements. Stripping can be accomplished when the sum of single-element gamma ray energy spectra from all elements equals or closely approximates the combined energy spectrum. In one method of stripping, the overall least-squares relative error of the sum of all single-element spectra to the combined energy spectrum is used as a criterium for data fitting. For example, the least-squares relative error per data energy point is less than 2% for an acceptable fit. The single-element energy spectrum of gamma rays from neutron inelastic scattering on C is shown in FIG. 11A whereas the single-element energy spectrum of gamma rays from neutron inelastic scattering on O is shown in FIG. 11B. Mg, Si, and Ca each can initiated gamma rays from both fast neutron inelastic scattering and thermal neutron capture reactions so that either the energy spectrum of gamma rays from inelastic scattering or from capture reaction can be utilized to identify the elements. The inelastic energy spectrum and the thermal capture energy spectrum for Mg are shown FIG. 11C and FIG. 11E, respectively. The gamma ray energy spectrum from fast neutron inelastic scattering on Si element is shown in FIG. 11D. The gamma ray energy spectrum from thermal neutron capture on Ca element is shown in FIG. 11F.

Once the energy spectrum for each element is stripped, Step 1207 calculates the elemental weight fraction for each element, e.g., using the cross-sections of fast neutron inelastic scattering and/or thermal neutron capture reaction of each element. The sum of weight fractions of all elements is set at approximately 100%.

In Step 1208, based on the weight fractions of C, O, Mg, Si, Ca from the detectors, one can determine the minerology types, such as $SiO_2$, $CaCO_3$, and $CaMg(CO_3)_2$. For example, if the weight fractions of O, Si elements are higher than pre-determined values, the formation is sandstone ($SiO_2$). If the weight fraction of C, O, Ca elements are higher than pre-determined values, but the weight fraction of Mg element is below the pre-determined value, the formation is limestone ($CaCO_3$). And if the weight fractions of C, O, Ca, Mg are all higher than pre-determined values, the formation is dolomite ($CaMg(CO_3)_2$).

Steps 1209 and 1210 are carried out to obtain the ratios of neutron count rates from the detectors. Specifically, in Step 1209, count rates from total neutrons as well as fast neutrons and thermal neutrons for each detector are obtained. Subsequently, in Step 1210, the ratios of count rates of thermal neutrons between any or all of two detectors among the three detectors are obtained. Specifically, a first ratio can be obtained from one pair of detectors, e.g., far to near; a second ratio can be between the far detector and the middle detector while the third ratio can be between the near detector and the middle detector. Note that the first ratio has a larger depth of investigation than the second ratio or the third ratio. Differences between the first ratio and the second or third ratio may indicate more significant impact of near wellbore effect so that the first ratio may be more reliable. Accordingly, the first ratio may be selected for the next step.

Alternatively, one may obtain a corrected neutron count ratio using the three or more ratios according to an algorithm. For example, as shown in Equations 1-6 in this disclosure and the descriptions thereof, multiple ratios can be used to obtain a corrected count ratio, which reduces interference the environments near the wellbore.

In Step 1211, with the formation type determined in Step 1208 and the count ratios determined in Step 1210, one can correlate the one or more neutron count ratios with the formation type and use the ratio-to-porosity transform specific to that formation type to obtain the real-time true formation porosity. For example, using a graph such as FIG. 1, one may first select the proper curve according to the identified formation type and then find the porosity on that curve that specific curve. Alternatively, a coefficient can be assigned to each formation type based on empirical data. The porosity obtained using the count ratio is multiplied by the coefficient to obtain the true formation porosity. In this disclosure, true formation porosity means porosity adjusted for specific formation type so that it is more accurate.

Additional embodiments are available. For example, each of the neutron count ratios obtained from Step 1210 can be used to obtain its corresponding formation porosity value in Step 1211. In this embodiment, Step 11 can yield three or more porosity values, which may not be equal to each other. One among the three or more porosity values may be selected as the formation porosity. Differences in these three or more porosity values may also reveal additional information about the near wellbore information.

Further, thermal neutrons and thermal neutron count rates at a detector are used as examples in this disclosure. However, the count rates and their ratios can also be based on epithermal neutrons detected by the detectors sensitive to epithermal neutrons. The methods disclosed therein remain applicable using epithermal neutron count rate ratios.

While in the foregoing specification this disclosure has been described in relation to certain preferred embodiments thereof, and many details have been set forth for purpose of illustration, it will be apparent to those skilled in the art that the disclosure is susceptible to alteration and that certain other details described herein can vary considerably without departing from the basic principles of the disclosure. In addition, it should be appreciated that structural features or methodologies shown or described in any one embodiment herein can be used in other embodiments as well.

What is claimed is:

1. A method for measuring subterranean formation porosity, comprising:
deploying a nuclear logging tool into a subterranean formation, wherein the nuclear logging tool comprises one or more neutron sources and two or more detectors disposed in a housing, each of the one or more neutron sources being configured to generate neutrons in pulses and each of the two or more detectors operable to detect neutrons and gamma rays;

causing the one or more neutron sources to emit neutrons in a plurality of neutron pulses into the subterranean formation and generating neutrons and gamma rays in the subterranean formation;

receiving neutrons and gamma rays at the two or more detectors;

separating signals from neutrons and signals from gamma rays for each of the two or more detectors;

obtaining one or more neutron count rates for each of the two or more detectors;

determining a formation type of the subterranean formation based on gamma rays received at the one or more detectors, wherein the formation type is selected from sandstone, limestone, dolomite, and mixtures thereof;

calculating one or more neutron count rate ratios between neutron count rates of two detectors selected from the two or more detectors; and obtaining one or more formation porosities based on the formation type and the one or more neutron count rate ratios, wherein the step of determining the formation type of subterranean formation comprises:

obtaining a first gamma ray energy spectrum from fast neutron inelastic scattering;

stripping the first gamma ray energy spectrum to identify a first plurality of elements in the subterranean formation;

obtaining a second gamma ray energy spectrum from thermal neutron capture reactions;

stripping the second gamma ray energy spectrum to identify a second plurality of elements in the subterranean formation; and identifying the formation type based on the first plurality of elements and the second plurality of elements.

2. The method of claim 1, wherein the plurality of identified elements comprises the first plurality of elements and the second plurality of elements.

3. The method of claim 2, further comprising calculating concentrations of the plurality of identified elements, and correlating the calculated concentrations to determine the formation type of the subterranean formation.

4. The method of claim 1, wherein one or more neutron count rates are selected from a total neutron count rate for total neutrons, a fast neutron count rate for fast neutrons, an epithermal neutron count rate for epithermal neutrons, and a thermal neutron count rate for thermal neutrons.

5. The method of claim 1, further comprising separating signals from neutrons from signals from gamma rays for each of the two or more detectors using a pulse shape discrimination technique.

6. The method of claim 1, wherein the first gamma ray energy spectrum is obtained during one of the plurality of neutron pulses and the second gamma ray energy spectrum is obtained between two consecutive neutron pulses of the plurality of neutron pulses.

7. The method of claim 1, wherein the formation porosity is obtained by correlating one of the one or more neutron count rate ratio with a ratio-to-porosity transform of the identified formation type.

8. The method of claim 1, wherein the nuclear logging tool comprises three or more detectors.

9. The method of claim 8, further comprising calculating three or more neutron count rate ratios based on neutron count rates received at the three or more detectors.

10. The method of claim 9, further comprising using the three of more count ratios to obtain one adjusted neutron count ratio, and the formation porosity is obtained by correlating the adjusted neutron count rate ratio with a ratio-to-porosity transform of the identified formation type.

11. The method of claim 9, further comprising correlating the three or more neutron count rate ratios with a ratio-to-porosity transform of the identified formation type to obtain three or more values of the formation porosity.

* * * * *